Patented Apr. 13, 1954

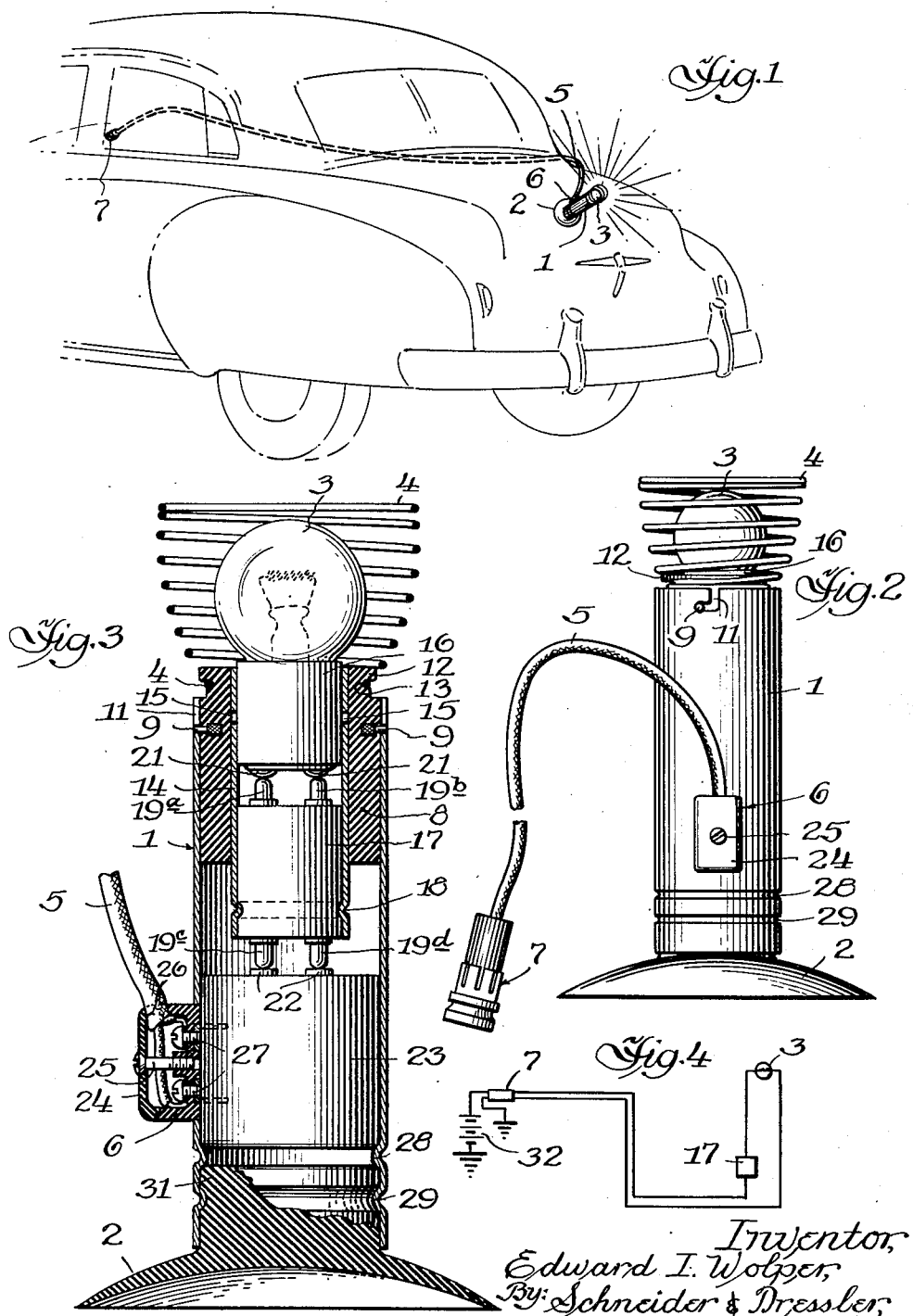

2,675,545

UNITED STATES PATENT OFFICE 2,675,545

FLASHING SAFETY LAMP

Edward I. Wolper, Chicago, Ill.

Application December 7, 1950, Serial No. 199,669

3 Claims. (Cl. 340—366)

This invention relates to a warning signal light, particularly to one adapted to be removably attached to an automobile or other automotive vehicle.

If an automobile or other vehicle is stalled in a crowded or high speed traffic zone, great damage to the vehicle and occupants may occur if there is no way of notifying approaching traffic that a vehicle is so positioned. Such dangerous conditions frequently occur because of mechanical failure, flat tires or other difficulties. To lessen the danger, I have provided a novel flashing device for use on the vehicle for warning approaching motorists. My device is useful at any time of day or in any type of weather conditions.

In accordance with my invention I provide a flashing warning signal device adapted to be removably attached to an automotive vehicle quickly and in a very simple manner. The attachment and detachment is made both physically and electrically, thus insuring that an adequate warning signal from a suitable vantage point is provided in a minimum of time.

The flash warning signal device of the present invention is simple and inexpensive to manufacture, easily assembled and disassembled and yet highly efficient in operation. It has other advantages which will become apparent from the following detailed description of the preferred illustrative embodiment shown in the drawings, wherein:

Figure 1 is a perspective view of the signal light attached physically to the external surface of an automobile and electrically to the electrical system of the automobile;

Fig. 2 is an elevational view of the signal light;

Fig. 3 is a detailed vertical sectional view of the signal light, portions thereof being shown in elevation; and Fig. 4 is a schematic representation of the electrical circuit contained in the signal light.

In the drawings there is shown a signal light having a substantially cylindrical housing 1 which may be fashioned from sheet stock, plastic or other suitable material. The housing 1 is somewhat elongated so that when the signal light is placed in position it may extend outwardly or upwardly in a manner to be clearly visible. Attached to the lower portion of the housing is a suction cup 2 preferably made of rubber or other resilient material capable of being held in place by air pressure. At the opposite end of the housing is an incandescent bulb 3. Surrounding the bulb 3 is a coiled helical spring 4 having its convolutions spaced apart, which serves to protect the bulb and yet allows the bulb to be clearly visible. The helical spring 4, because of its resiliency, is not susceptible to damage due to blows or objects which might strike the unit.

An electrical conduit 5 is connected at one end to the housing 1 by means of a connecting box 6, the other end of the conduit being attached to a lighter plug 7 of standard construction. When the lighter plug 7 is placed in the lighter receptacle (not shown) of an automotive vehicle, the bulb 3 is intermittently energized. As is known, the lighter receptacle, of standard construction is electrically connected to the electrical system of the vehicle in accordance with conventional procedures. The specific electrical structure contained within housing 1 which causes the bulb to be intermittently energized will be presently described.

It is contemplated in accordance with the present invention that should the automotive vehicle be without a lighter receptacle, the conduit 5 may terminate in any ordinary contacts which may be attached directly to the battery of the vehicle. For convenience, however, the use of a lighter plug 7 is to be preferred.

Referring to Fig. 3, it will be seen that housing 1 contains a cylindrical cushion member 8 preferably made from rubber or other resilient material. Imbedded and firmly secured within the cushion member are pins 9 adapted to be locked in a bayonet socket 11 in the housing. The cushion member 8 may thus readily be inserted or removed from the housing. The upper end of the cushion member 8 is provided with a circumferential lip 12 and an associated groove 13 adapted to receive the helical spring 4 which is held in the groove 13 frictionally. Further resiliency is afforded the helical spring 4 because of its mounting in the resilient cushion member 8.

The cushion member 8 has an axial bore, allowing a cylindrical mounting tube 14 to be secured therein in any appropriate manner. The mounting tube 14 may be fashioned from sheet stock, plastic or other suitable material, and has near its upper edge suitable bayonet sockets (not shown) adapted to receive bayonet pins 15 attached to a bulb socket 16. The bulb socket 16 may thus be readily removed or inserted into the mounting tube 14 and locked firmly in place. The bulb 3 is mounted in the socket 16 in a conventional manner, the manner of mounting depending upon the type of bulb and socket used. A bayonet type bulb and socket or a screw-in bulb and socket might be employed, for example.

Within the mounting tube 14 is a flasher unit 17 adapted to cause the bulb 3 to be intermittently illuminated. Any flasher unit which will function at the necessary voltage and amperage might be employed; however, I prefer to use a flasher of the thermo-responsive type such as that disclosed in United States Letters Patent No. 1,979,349. The flasher unit 17 is frictionally secured in the mounting tube 14 by means of an internal circumferential rib 18 in the mounting tube 14. Electrical contacts 19a, 19b, 19c and 19d connect the flasher electrically to contacts 21 of the socket 16 and to contacts 22 of an intermediate connecting box 23.

It is manifest from the foregoing that when the cushion member 8 is removed, the helical spring 4, bulb 3, socket 16 and flasher 17 will also be removed from the housing 1. Similarly, the helical spring may be removed from the cushion member 8 because of the resiliency of the cushion member. Socket 16 and bulb 3 may be removed from the mounting tube 14 and the flasher 17 is also easily accessible for repair. The removability of the socket 16 from the mounting tube 14 is aided by the fact that the contacts 19a, 19b, 19c and 19d are spring contacts (springs not shown) so that when the pin 15 on the socket 16 is inserted into the bayonet socket of the mounting tube 14, the spring contacts 19a and 19b will be depressed. Also, the pins 9 in the cushion member 8 may be readily inserted into the bayonet joint 11 because of the resiliency of the contacts 19c and 19d as they strike the contacts 22.

The connecting box 6 may be made from any suitable material and is attached in any suitable manner to the housing 1. A cover plate 24 detachably secured in place by a screw 25 allows the interior of the connecting box 6 to be accessible. The conduit 5 enters the connecting box 6 through an opening 26 and the two leads of the conduit are secured to screws 27. Screws 27 are electrically connected (not shown) to the contacts 22 in the intermediate connecting box 23, the intermediate connecting box serving merely to connect the leads of the conduit 5 to the contacts 19c and 19d of the flasher 17.

The lower portion of the housing 1 is provided with internal circumferential ribs 28, 29 which allow the suction cup 2 to be firmly mounted therein. The suction cup 2 has an upper portion 31, the top surface of which is restricted by the circumferential rib 28. Circumferential rib 29 frictionally holds the upper body portion 31 of the suction cup 2 in position within the housing 1.

Referring to Fig. 4, it will be seen that the bulb 3 is connected electrically in series with the flasher 17, the bulb and flasher being connected with the lighter plug 7 which in turn is energized by a source of electrical energy 32. Referring to Fig. 3, the conduit 5 is electrically connected through screws 27, contacts 22, flasher 17, socket 16 and bulb 3. The contacts 19a and 19c of the flasher unit 17 do not pass through the flasher switches (not shown) but rather, are directly connected to one another, the flasher switches being connected electrically between contacts 19b and 19d only.

In operation, the warning light may be placed by means of the suction cup 2 on any surface of the automobile, whether it be metal, glass, plastic or any other smooth surface. While the unit is shown in Fig. 1 as being attached to the trunk of an automobile, obviously it might be placed on the top of the car, sides of the car, windows of the car or any other portion thereof and at any angle. Furthermore, the suction cup 2 enables the unit to be placed on any external surface as for example, a road sign. The signal light may also be set in the road.

When the unit is placed in the desired position, the lighter plug 7 is placed in the lighter receptacle. This closes the electrical circuit as shown in Fig. 4 and the bulb 3 will immediately be energized. Because of the presence of the flasher 17 in the circuit, the energizing of the bulb 3 will be intermittent causing the bulb to flash on and off and to be much more visible than one which remains lit continuously. If the bulb 3 is colored red; it will be even more noticeable and will signify danger to approaching motorists.

Although I have described a preferred embodiment of the invention in considerable detail, it will be understood that the description is illustrative and not restrictive as many details of construction may be modified or changed without departing from the spirit or scope of the invention. Accordingly, I do not desire to be limited to the precise details of the described structure.

I claim:

1. A warning signal adapted to be detachably connected to any portion of a vehicle having a lighter receptacle in the electrical circuit of the vehicle, said signal comprising an elongated housing, an electric lamp extending outwardly from one end of said housing, a resilient cushion member in said housing adjacent said lamp, a helical spring mounted on said cushion member and surrounding said lamp, a flasher in said housing electrically connected to said lamp, means for connecting electrically said lamp and said flasher to the lighter receptacle of said vehicle, and a suction cup for detachably securing the signal to a smooth surface.

2. A warning signal adapted to be detachably connected to any portion of a vehicle having a lighter receptacle in the electrical circuit of the vehicle, said signal comprising an elongated housing, an electric lamp extending outwardly from one end of said housing, a resilient cushion member in said housing adjacent said lamp, protection means mounted on said cushion member and surrounding said lamp, said protection means permitting light rays to emanate outwardly therethrough, a flasher in said housing electrically connected to said lamp, means for connecting electrically said lamp and said flasher to the lighter receptacle of said vehicle, and a suction cup for detachably securing the signal to a smooth surface.

3. A warning signal adapted to be detachably connected to any portion of a vehicle having a lighter receptacle in the electrical circuit of the vehicle, said signal comprising an elongated housing, an electric lamp extending outwardly from one end of said housing, a resilient cushion member in said housing adjacent said lamp, protection means mounted on said cushion member and surrounding said lamp, said protection means permitting light rays to emanate outwardly therethrough, a flasher in said housing electrically connected to said lamp, and means for connecting electrically said lamp and said flasher to the lighter receptacle of said vehicle.

References Cited in the file of this patent

UNITED STATES PATENTS

| Number | Name | Date |
| --- | --- | --- |
| 1,695,712 | Johnson | Dec. 10, 1928 |
| 1,713,052 | Page | May 14, 1929 |
| 2,492,296 | Koblas | Dec. 27, 1949 |
| 2,496,618 | Cox et al. | Feb. 7, 1950 |